(12) United States Patent
Nishii

(10) Patent No.: US 8,351,065 B2
(45) Date of Patent: Jan. 8, 2013

(54) PRINT SYSTEM FOR REQUESTING PAPER STOCK INFORMATION IN PAPER FEED TRAYS OF PRINTERS ON NETWORK

(75) Inventor: Wataru Nishii, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1033 days.

(21) Appl. No.: 12/351,933

(22) Filed: Jan. 12, 2009

(65) Prior Publication Data

US 2009/0184456 A1 Jul. 23, 2009

(30) Foreign Application Priority Data

Jan. 22, 2008 (JP) .................. 2008-011262

(51) Int. Cl.
- *G06F 3/12* (2006.01)
- *G06K 15/00* (2006.01)
- *B65H 3/44* (2006.01)
- *B65H 5/26* (2006.01)
- *G03G 15/00* (2006.01)

(52) U.S. Cl. .............. 358/1.15; 358/1.12; 271/9.01; 271/9.03; 271/9.06; 399/16; 399/81

(58) Field of Classification Search .............. None
See application file for complete search history.

(56) References Cited

U.S. PATENT DOCUMENTS 6,023,593 A 2/2000 Tomidokoro

2004/0101336 A1* 5/2004 Azami ................. 400/61

FOREIGN PATENT DOCUMENTS

| JP | 1998-026906 | 1/1998 |
|---|---|---|
| JP | 2001-18494 | 1/2001 |
| JP | 2002-108597 | 4/2002 |
| JP | 2006-221426 | 8/2006 |

OTHER PUBLICATIONS

JP-2002108597-translation.*
JP-2006221426-translation.*

* cited by examiner

*Primary Examiner* — Fan Zhang

(74) *Attorney, Agent, or Firm* — Renner, Otto, Boisselle & Sklar, LLP

(57) ABSTRACT

When a paper sheet is required during execution of a print job, a printing apparatus requests paper sheet information about the states of paper feed trays from the other printing apparatuses. When the other printing apparatuses transmit the paper sheet information, the printing apparatus of the request source displays a search result display screen 22 which represents the states, such as the size, type, and residual amount of paper sheet in the paper feed tray of each of the other printing apparatuses. By viewing the screen 22, the user is able to determine the position of the printing apparatus and the paper feed tray, in which the required paper sheet is stored. Therefore, when the paper sheet is required during execution of the print job, the paper sheet can be quickly replenished by notifying the presence position of the paper sheet.

8 Claims, 10 Drawing Sheets

FIG. 4
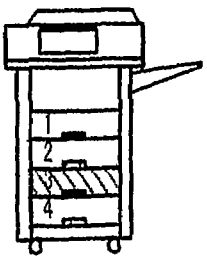
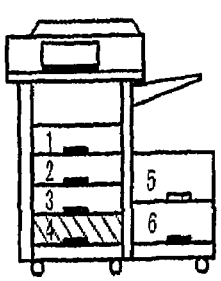

PAPER FEED TRAY SEARCH SETTING [RETURN] [SETTING]

1: PAPER SHEET SIZE CONDITION — B4
2: PAPER SHEET TYPE CONDITION — REGULAR PAPER
3: PAPER SHEET AMOUNT CONDITION — NOT SPECIFIED
4: RESIDUAL PAPER SHEET CONDITION — 50% OR MORE
5: USE STATE CONDITION — NOT SPECIFIED

31

1: PAPER SHEET SIZE CONDITION

| A3 |
| B4 |
| A4 |
| B5 |
| A5 |
| Ledger |
| Legal |
| Letter |

32

2: PAPER SHEET TYPE CONDITION

| REGULAR PAPER |
| LETTERHEAD PAPER |
| PRINTED PAPER |
| PUNCH PAPER |
| RECYCLED PAPER |
| PAPERBOARD |
| THIN PAPER |
| COLOR PAPER |

33

3: PAPER SHEET AMOUNT CONDITION

| NOT SPECIFIED |
| 1 SHEET |
| 5 SHEETS OR LESS |
| 10 SHEETS OR LESS |
| 50 SHEETS OR LESS |
| 100 SHEETS OR LESS |

34

4: RESIDUAL PAPER SHEET AMOUNT CONDITION

| NOT SPECIFIED |
| 25% OR MORE |
| 50% OR MORE |
| 75% OR MORE |

35

5: USE STATE CONDITION

| NOT SPECIFIED |
| POWER SAVING STATE |
| STANDBY |
| IN USE |

36

(b)

SEARCH RESULT: B4, REGULAR PAPER, NOT SPECIFIED [RETURN]

| | MACHINE NAME·TRAY | RESIDUAL AMOUNT | STATE |
|---|---|---|---|
| 1 | MFP_B : TRAY 3 | 75% | PRINTING |
| 2 | MFP_D : TRAY 4 | 50% | STANDBY |

1/1

22

FIG. 8
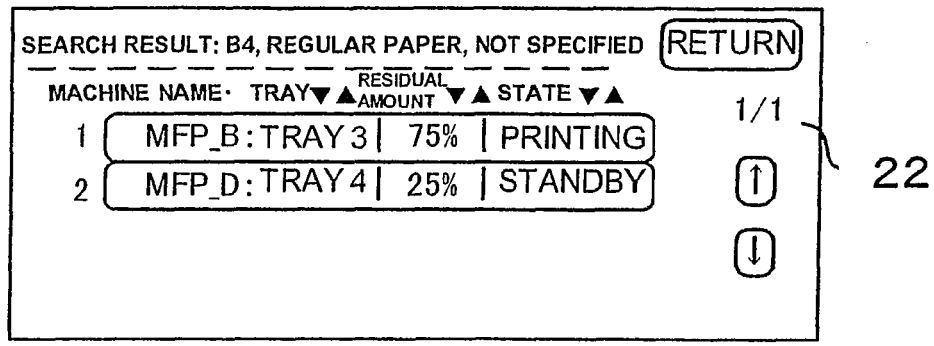
SECOND BUTTON "MFP_D: TRAY 4" IS SELECTED
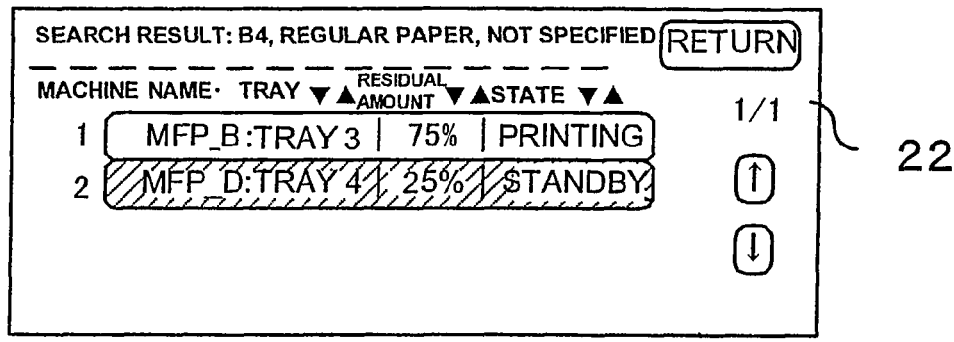
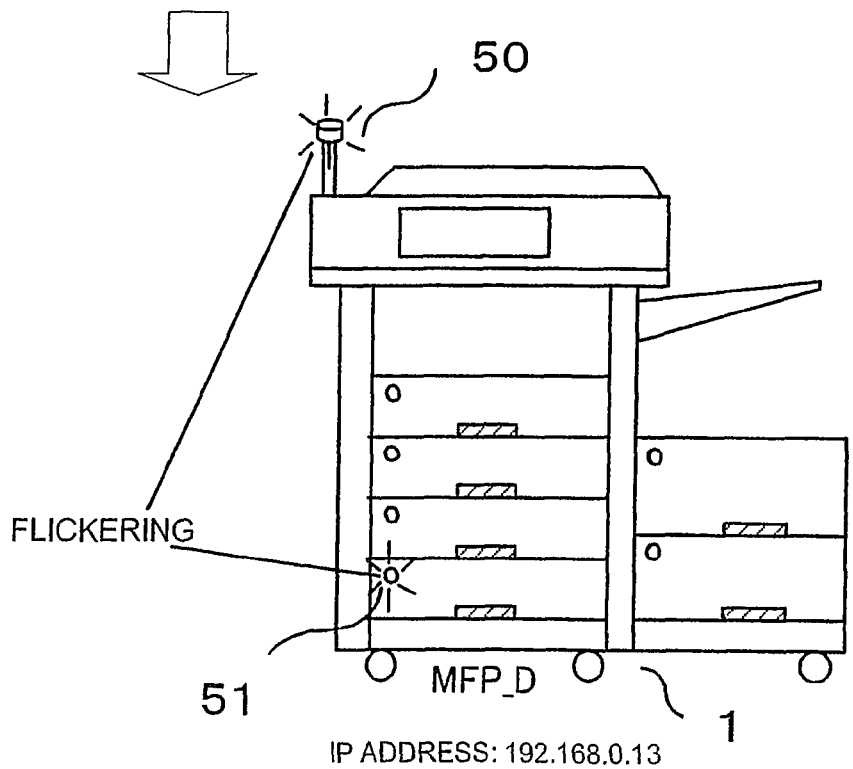

PRINT SYSTEM FOR REQUESTING PAPER STOCK INFORMATION IN PAPER FEED TRAYS OF PRINTERS ON NETWORK

BACKGROUND OF THE INVENTION

1. Field of the Invention

The present invention relates to a print system in which a plurality of printing apparatuses are communicably connected to each other via a network.

2. Description of the Related Art

A printing apparatus includes a plurality of paper feed trays. Paper sheets having a different size or type are set to the paper feed trays, respectively. According to a print job, the printing apparatus selects a paper feed tray storing specified paper sheets, and performs a printing operation on the paper sheet fed from the paper feed tray.

When the paper sheet in the paper feed tray is exhausted during execution of the print job, the job is stopped. When the paper sheet is replenished, the print job is resumed. Further, as described in Japanese Patent Laid-Open No. 2001-18494, when the paper sheet exhaustion is detected during execution of the print job, the printing apparatus searches a paper feed tray storing the paper sheet of the same type as specified. When there is a paper feed tray corresponding to the paper sheet, the paper sheet is fed from the paper feed tray.

However, usually, in a printing apparatus, different types of paper sheets are respectively set in a plurality of paper feed trays. Therefore, there is less possibility that the paper sheets of the same type as that of the exhausted paper sheet are present in the printing apparatus. Thus, when paper sheets are required, a user takes out the paper sheets of the same type as that of the required paper sheet from a paper feed tray of a nearby printing apparatus, and replenishes the paper sheets to the paper feed tray of the printing apparatus in use. Thereby, the printing job can be resumed.

There is a case where the paper sheets are not stored in the printing apparatus usually used for replenishing the paper sheet. The user is required to search the paper sheet, so that it takes time to resume the print job. During this period, the printing apparatus cannot be used, which causes trouble to other users.

In view of the above, an object of the present invention is to provide a print system capable of, when paper sheets are required, quickly replenishing the paper sheets by notifying the presence position of the paper sheets.

SUMMARY OF THE INVENTION

The present invention is to provide a print system which is configured by communicably connecting a plurality of printing apparatuses having a paper feed tray to each other via a network, and which is featured in that the printing apparatus includes a monitoring section configured to monitor the state of the paper feed tray, and a control section configured to control a printing operation according to the state of the paper feed tray, and in that the control section collects paper sheet information on the state of the paper feed tray from the other printing apparatus and provides the paper sheet information to a user.

The paper sheet information includes information about the size, type, residual amount, and the like, of paper sheets stored in the paper feed tray. Upon receipt of the paper sheet information, the user is able to know what type of paper sheet is stored in the paper feed tray of the other printing apparatus. The user is able to find out the required paper sheet by using the paper sheet information.

When paper sheets are required to be replenished to a paper feed tray of a printing apparatus, the control section of the printing apparatus searches, on the basis of the paper sheet information, a paper feed tray of the other printing apparatus, in which tray available paper sheets are stored. During execution of a print job, when paper sheets are exhausted or when the amount of paper sheets becomes less than a specified amount, the paper sheets are required to be replenished.

When it is detected that the paper sheets are required, the control section requires the paper sheet information from the other printing apparatus. The control section of the other printing apparatus acquires the paper sheet information from the monitoring section, and returns the acquired paper sheet information to the printing apparatus of the request source. Then, the control section, which has collected the paper sheet information, searches the required paper sheet. At this time, the control section may search the other printing apparatus according to a specific condition. The search is performed to find out, on the basis of the paper sheet information, a paper feed tray in which the same paper sheet as the required paper sheet is stored.

The control section displays a list of searched paper feed trays. Further, the control section switches the display order of paper feed trays according to the easiness in obtaining the paper sheet. This enables the user to easily recognize the presence position of the required paper sheet, and enables the user to easily obtain the paper sheet.

The control section notifies the position of the paper feed tray selected from the searched paper feed trays. The selected paper feed tray is present in the other printing apparatus. Thus, the presence position of the paper feed tray is displayed on a screen.

Alternatively, when the paper feed tray is selected, the control section instructs the other printing apparatus having the paper feed tray to perform notification. The printing apparatus includes a notifying section configured to indicate the position of the paper feed tray. When the paper feed tray is selected, the control section operates the notifying section in response to the instruction, so as to notify the position of the paper feed tray. For example, the other printing apparatus notifies the presence thereof by light or sound. In this way, the user is able to easily recognize the presence position of the paper feed tray.

When the paper feed tray is selected, the control section transmits a paper sheet request message to the other printing apparatus having the paper feed tray, and the other printing apparatus notifies the received message. When there is a user using the other printing apparatus, the user recognizes the message, and rejects or permits the request for taking out the paper sheet.

According to the present invention, when paper sheets are required during execution of a print job, a user is able to immediately know the presence position of the required paper sheet by searching the paper sheet stored in a paper feed tray of the other printing apparatus. As a result, the user is able to immediately obtain the paper sheet without searching around for the paper sheet and to quickly resume the interrupted print job.

BRIEF DESCRIPTION OF THE DRAWINGS

FIG. 4 is a figure showing a search condition setting screen and a search result display screen;

FIG. 6 is a figure showing a search setting screen and a search result display screen;

FIG. 8 is a figure showing a state of notification performed by a printing apparatus having a paper feed tray at the time when the paper feed tray is selected;

DETAILED DESCRIPTION OF THE PREFERRED EMBODIMENTS

Figure 1:
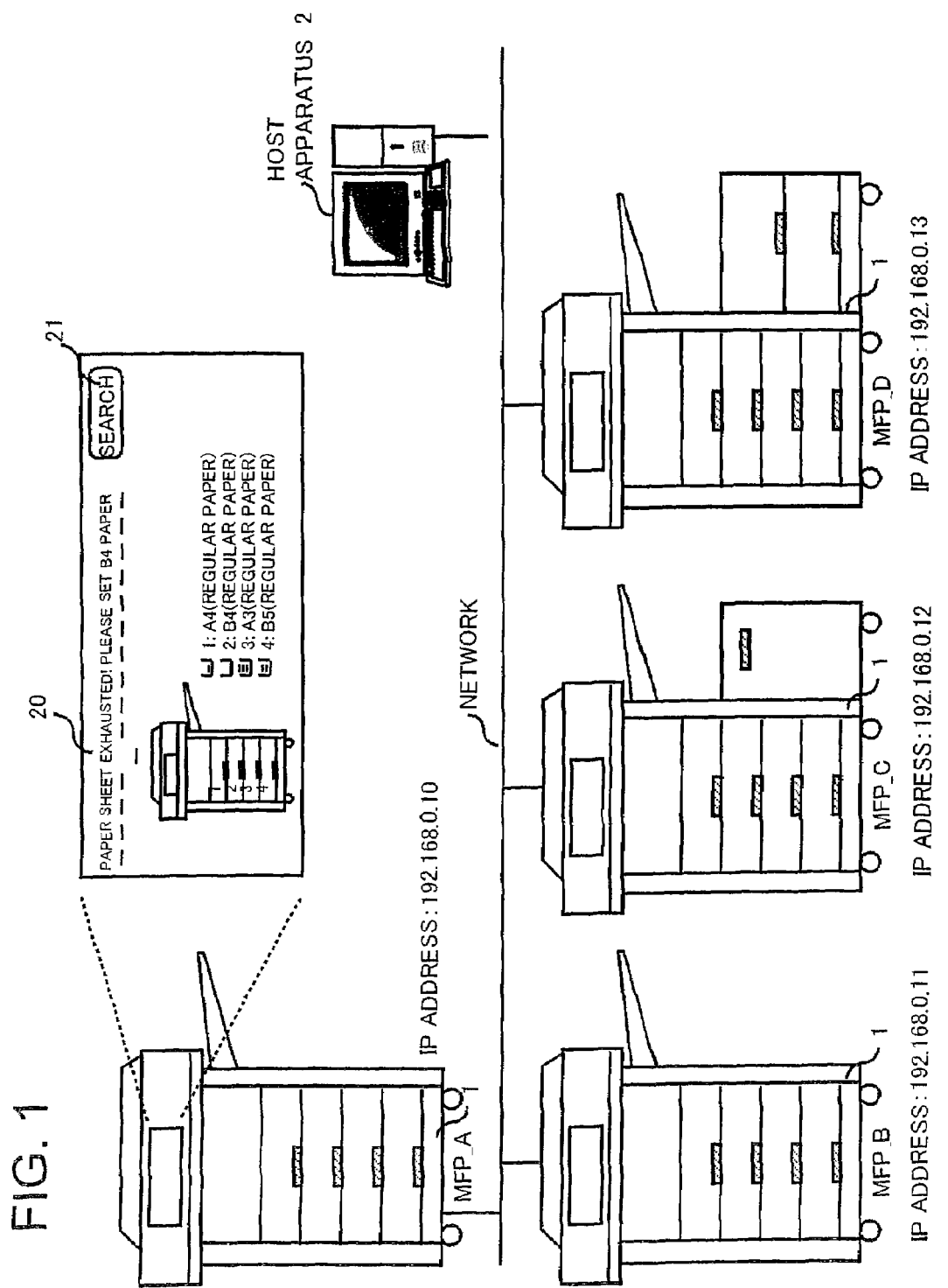
FIG. 1 is a figure showing a schematic configuration of a print system according to the present invention.

FIG. 1 shows a print system according to the present embodiment. The print system is configured by a plurality of printing apparatuses 1 and a host apparatus 2 which manages the printing apparatuses 1. Each of the printing apparatuses 1 and the host apparatus 2 are communicably connected to each other via a network, such as a LAN.

The printing apparatus 1 is an MFP which performs each of copying processing, printing processing, scanning processing, facsimile communication processing, and document filing processing. Note that as the printing apparatus 1, at least the functions to perform the copying processing and the printing processing may be provided in the apparatus. The host apparatus 2 is a personal computer or a server. Further, a personal computer (not shown) is connected to the network.

Figure 2:
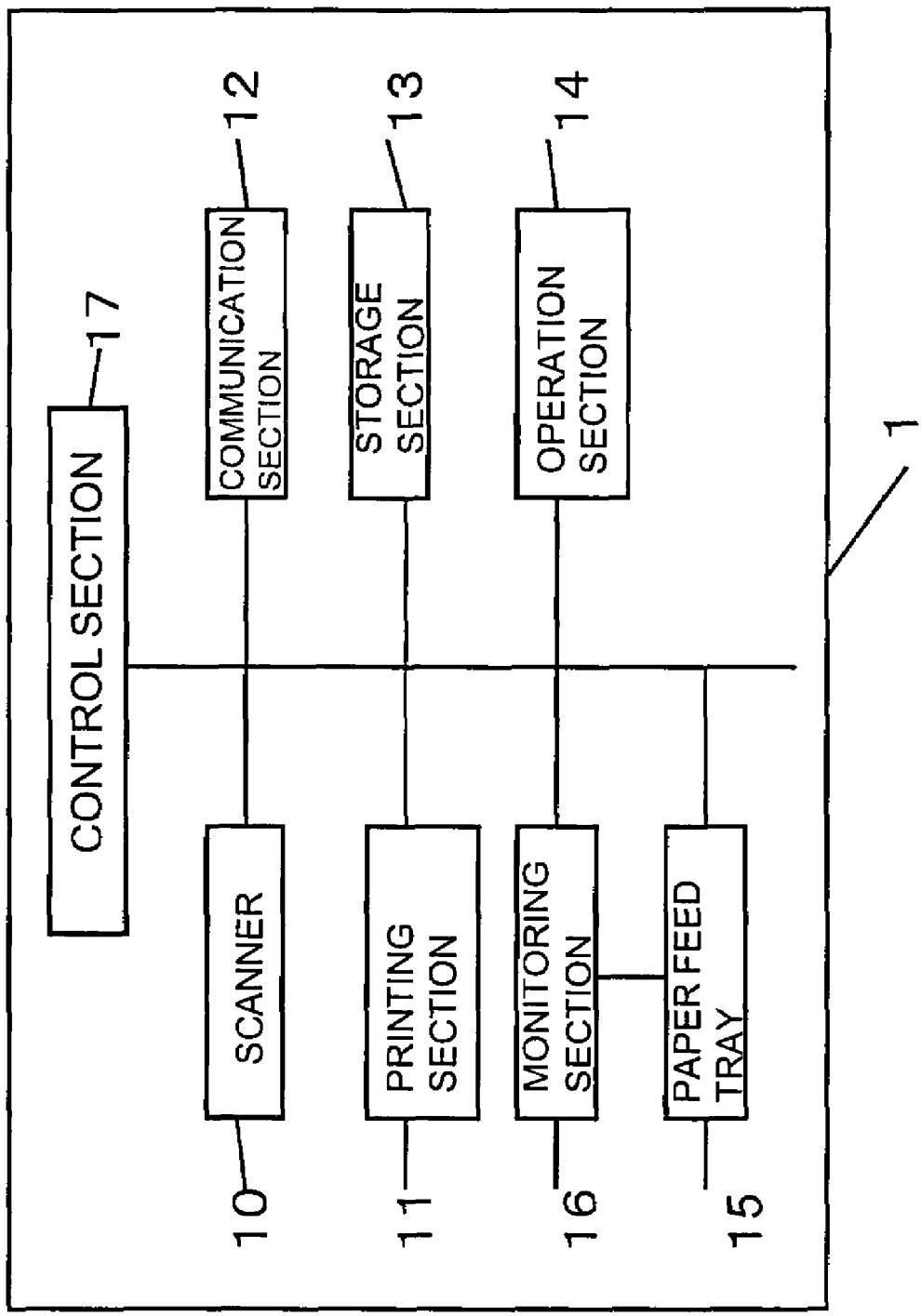
FIG. 2 is a block diagram showing a schematic configuration of a printing apparatus.

The printing apparatus 1 includes, as shown in FIG. 2, a scanner 10, a printing section 11, a communication section 12, a storage section 13, an operation section 14, paper feed trays 15, a monitoring section 16, and a control section 17.

The scanner 10 reads an image of a document. The printing section 11 prints an inputted image on a paper sheet. The communication section 12 performs communication with other printing apparatuses 1 and the host apparatus 2 via the network. A unique IP address is assigned to each of the printing apparatuses 1 and the host apparatus 2. The communication section 12 transmits and receives data by using the IP address, and receives an image from the other printing apparatuses 1, the host apparatus 2, and the personal computer. Further, the communication section 12 includes a modem connected to a telephone line, and is able to perform facsimile communication via the modem.

The storage section 13 stores the image inputted from the scanner 10 or via the communication section 12. The operation section 14 includes an operation key and a display panel. The display panel includes a touch panel, and displays an operation screen, or the like, on which an input operation can be performed.

A plurality of paper feed trays 15 are provided. Each of the paper feed trays 15 stores paper sheets of different size and type. The size of the paper sheet is A size, B size, Letter size, Legal size, Ledger size, or the like. The type of the paper sheet is a plain paper, a recycled paper, a letter head paper, a printed paper, a punch paper, a paperboard, a thin paper, a colored paper, or the like.

The monitoring section 16 monitors the state of the paper feed tray 15. The monitoring section 16 includes a sensor for detecting the size of the paper sheet in the paper feed tray 15, and a sensor for detecting the amount of the paper sheets. By means of the sensors, the monitoring section 16 detects the presence of the paper sheet stored in the paper feed tray 15 and the size of the paper sheet set in the paper feed tray 15. Further, the type of the paper sheet of the each paper feed tray 15 is set by the user. The setting information is stored in a memory. Then, the monitoring section 16 generates paper sheet information relating to the state of the paper feed tray 15 on the basis of the detection results and the setting information, and outputs the paper sheet information to the control section 17.

The control section 17, which is configured by a CPU, a ROM and a RAM, performs control of the respective sections and performs instructed processing operations. For example, as for the printing processing, in the case of copying, when an image is inputted from the scanner 10, the control section 17 generates a print job and performs the print job. In the case of printing, when receiving a print job from the outside, the control section 17 performs the print job according to the instruction of the job. In the case of the facsimile communication, when an image is received from the outside, the control section 17 generates a print job and performs the generated print job.

The monitoring section 16 monitors the state of the paper feed tray 15 during execution of the print job. When the monitoring section 16 detects that the paper sheet of the paper feed tray 15 in use is exhausted, the control section 17 stops the printing, and displays a message screen 20 representing the paper sheet exhaustion on the screen of the display panel.

When the paper sheet is required in this way, the control section 17 collects the paper sheet information from the other printing apparatuses 1 and searches the presence of available paper sheet. That is, when the user operates a search button 21 on the screen, the control section 17 requires the other printing apparatuses 1 to transmit the paper sheet information. In the other printing apparatuses 1, upon receipt of the request, the control section 17 transmits the paper sheet information to the printing apparatus of the request source. The monitoring section 16 always monitors the state of the paper feed tray 15, and hence the paper sheet information is the latest information.

Upon receipt of the paper sheet information from each of the other printing apparatuses 1, the control section 10 of the printing apparatus 1 of the request source provides the paper sheet information to the user. That is, from the paper sheet information, the control section 17 searches the paper feed tray 15 of each of the other printing apparatuses 1, in which tray the paper sheets of the same size and type as those of the required paper sheet are set. Then, the control section 17 displays, on the basis of the paper sheet information, the state of each of the paper feed trays 15 of the other printing apparatuses 1 on the screen of the display panel. Thereby, the information for determining whether or not the required paper sheets can be obtained is provided to the user.

Figure 3:
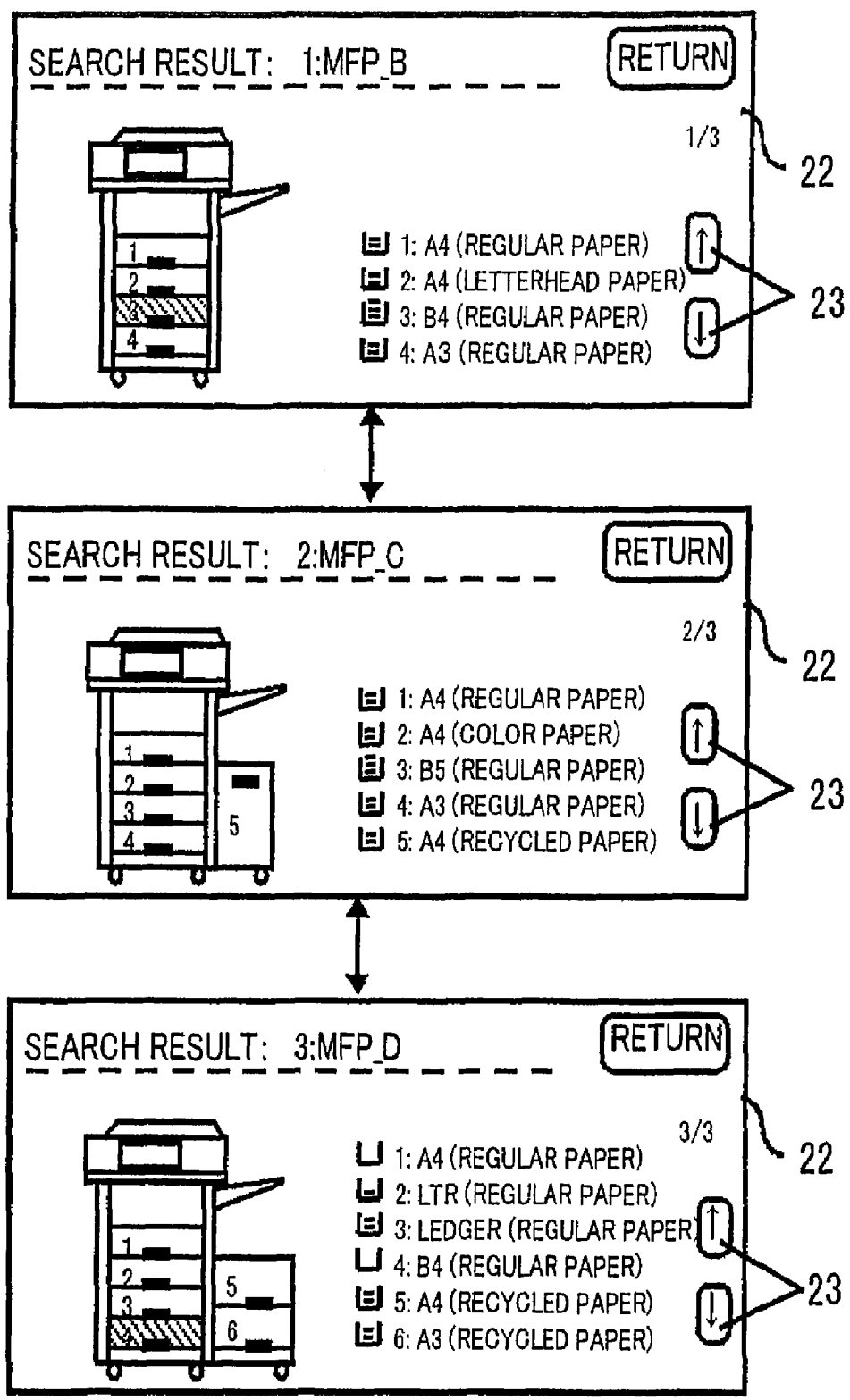
FIG. 3 is a figure showing a search result display screen of a paper sheet.

As shown in FIG. 3, the state of each of the paper feed trays 15 is displayed for each of the printing apparatuses 1. The size, type, and residual amount of the paper sheets set in each of the paper feed trays 15 are displayed on the search result display screen 22. The paper feed tray 15 of the paper sheet corresponding to the required paper sheet is displayed in a conspicuous manner, such as a reverse manner and a flashing manner, which is different from the manner for displaying the other paper feed trays 15. The display is switched by an operation of upper and lower keys 23 on the screen, so that the states of the paper feed trays 15 of the other printing apparatuses 1 are displayed.

The user is able to know that the required paper sheet is stored in MFP_B and MFP_D, by viewing the display. Further, the user finds out that no paper sheet is stored in MFP_D, and hence is able to determine that the paper sheet may be taken out from MFP_B in which a sufficient amount of the paper sheets are stored. The user takes out the paper sheets from the paper feed tray 15 of MFP_B, and replenishes the paper sheets to the empty paper feed tray 15. Thereby, the print job is resumed.

In this way, the user is able to recognize at a glance the presence position of the required paper sheet, and hence is able to obtain the paper sheet for replenishment without searching around for the paper sheet. As a result, the print job can be quickly resumed, and the time period during which the printing apparatus 1 cannot be used is reduced. Thereby, it is possible to realize a system with high use efficiency.

Note that the required paper sheet is present in the storage place of the paper sheet. The paper sheet in the storage place may also be used. However, it is necessary to unseal the paper sheet package and this work is troublesome. In particular, the troublesomeness is remarkable at the time when the required amount of paper sheets is small. Thus, when the user takes out the required amount of paper sheets from the paper feed tray 15, the replenishment work is completed in a short time.

Here, in the case of searching the paper feed tray 15, the searching range can be narrowed down according to specific conditions. As shown in FIG. 4(a), the control section 17 displays a search condition setting screen 24. The search condition specifies a printing apparatus 1 to be searched. The set search condition is stored in the memory. Alternatively, the control section 17 authenticates a user at the time of execution of the print job, and searches the printing apparatus 1 according to the search condition set beforehand, on the basis of the authentication information of the registered user.

As the search condition, for example, a printing apparatus 1 which is usually used by the user is set as a target to be searched. Alternatively, a printing apparatus 1 managed in a group to which the user belongs is set as a target to be searched. The control section 17 collects the paper sheet information from all of the printing apparatuses 1, but searches a paper feed tray 15 of the target printing apparatus 1 according to the search condition.

When the search is completed, the search result display screen 22 is displayed as shown in FIG. 4B. The state of the paper feed tray 15 of the search target printing apparatus 1 is displayed on the screen. The state of the paper feed tray 15 of the printing apparatus 1 other than the search target printing apparatus 1 is not displayed. Therefore, it is possible for the user to obtain the paper sheet from the printing apparatus 1 which is convenient for the user.

Figure 5:
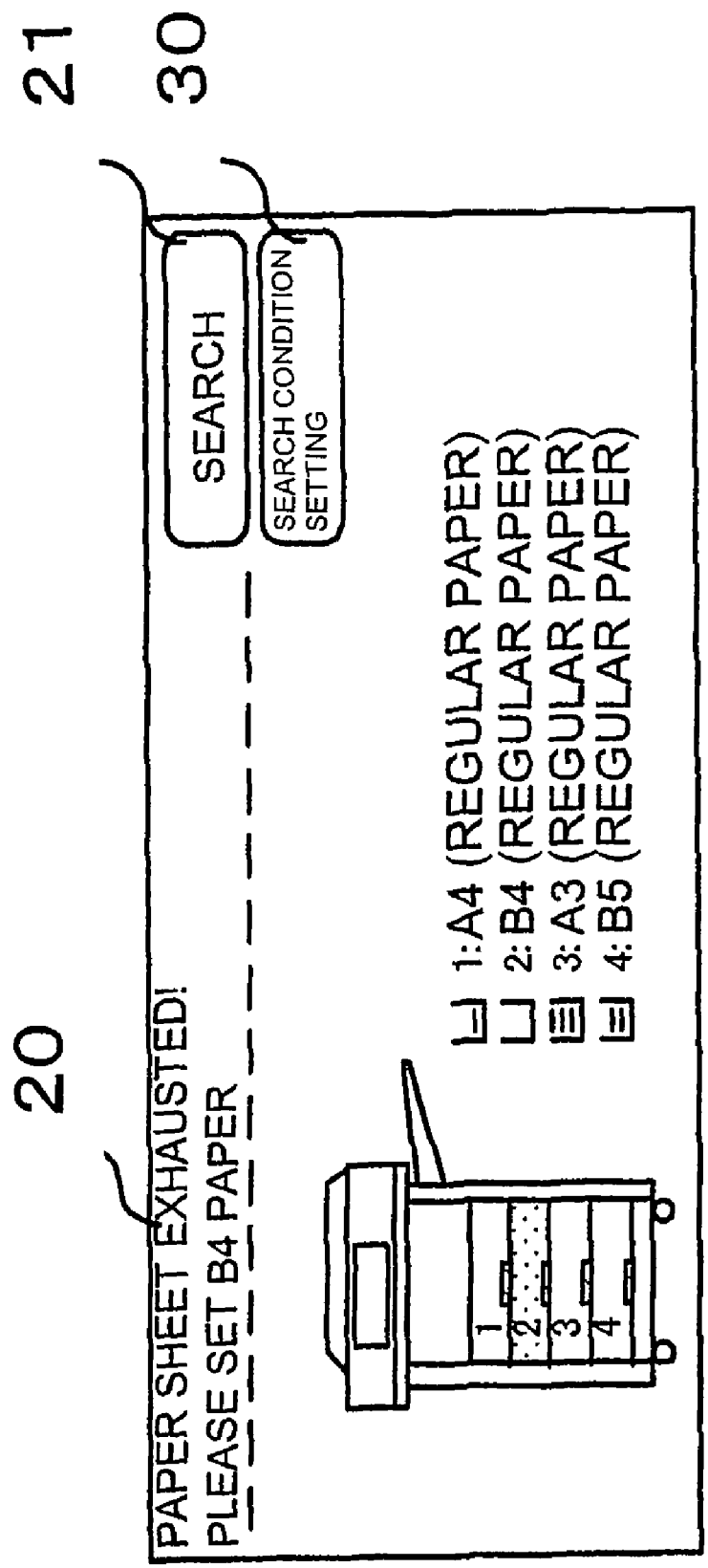
FIG. 5 is a figure showing a message screen.

The above described search condition is set beforehand, but the search condition may be inputted each time the searching operation is performed. As shown in FIG. 5, a search condition setting button 30 is displayed in the paper sheet exhaustion message screen 20. When the user operates the button 30, the control section 17 displays, as shown in FIG. 6(a), a search setting screen 31 used for adding a search condition. As the search condition, there are respective items of a paper sheet size condition 32, a paper sheet type condition 33, a paper sheet amount condition 34, a residual paper sheet amount condition 35, and an operating state condition 36. The user specifies the search condition for each of the items. The control section 17 stores the inputted search condition in the memory, and performs the searching operation according to the search condition.

As shown in FIG. 6(b), the state of the paper feed tray 15 of the printing apparatus 1 which corresponds to the search condition is displayed on the search result display screen 22. Therefore, only the paper feed tray 15 of the printing apparatus 1, in which tray the paper sheet desired by the user is stored, is searched, so that the user is able to surely know the presence position of the required paper sheet.

Figure 7:
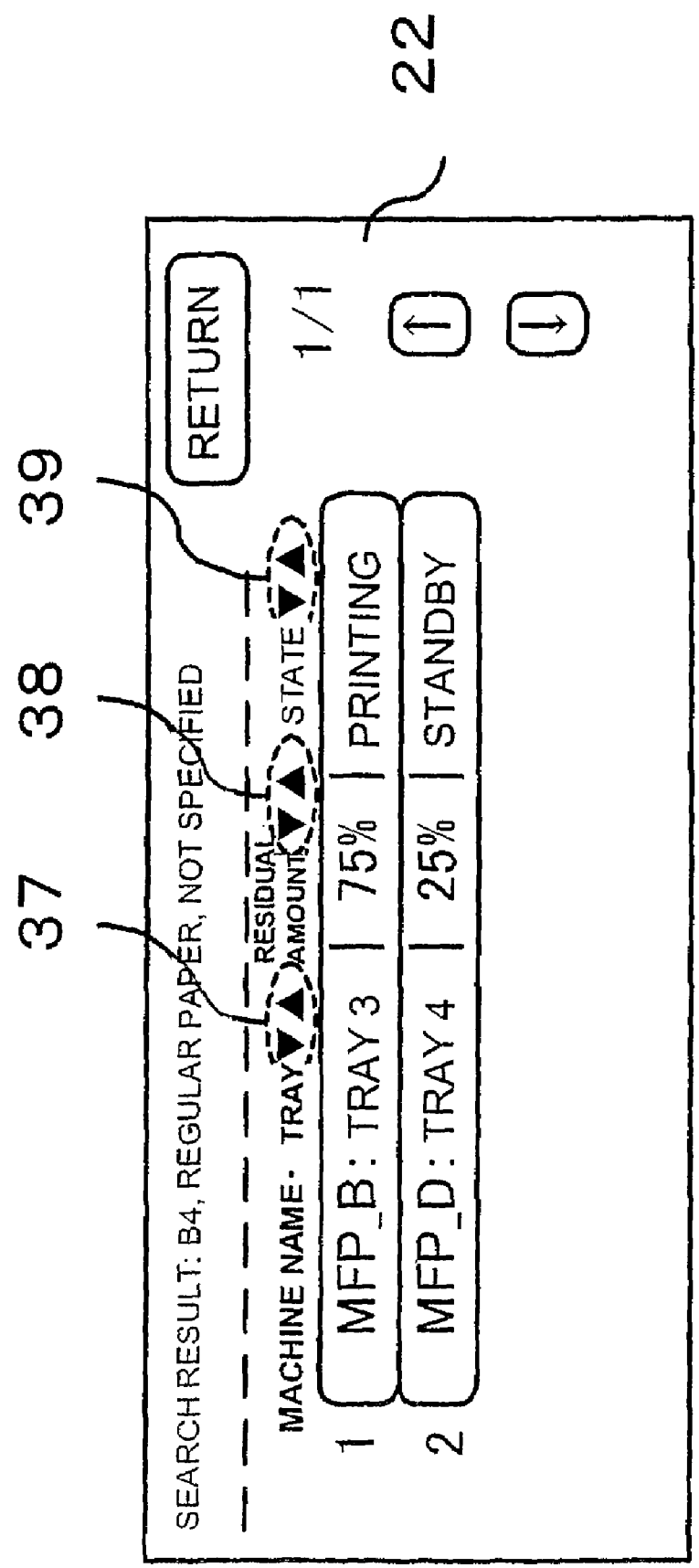
FIG. 7 is a figure showing a search result display screen in which the display order can be switched.

Further, the control section 17 switches the display order of the paper feed trays 15 according to the easiness in obtaining the paper sheet. As shown in FIG. 7, rearrangement buttons 37 to 39 are displayed on the search result display screen 22. The rearrangement buttons 37 to 39 are provided for each of the items.

In the initial screen, the paper feed trays 15 are displayed in the order of the machine name of the printing apparatus 1. The priority order is determined beforehand for the printing apparatuses 1. When the machine name rearrangement button 37 is operated, the printing apparatuses 1 are rearranged in the priority order. When the rearrangement button 38 with respect to the residual paper sheet amount is operated, the paper feed trays 15 are rearranged in order from the larger residual paper sheet amount. When the operating state rearrangement button 39 is operated, the paper feed trays 15 are rearranged in such a way that the paper feed tray 15 in the standby state is displayed in the upper portion, and that the paper feed tray 15 during printing is displayed in the lower portion.

The paper feed tray 15 displayed in the upper portion is the paper feed tray 15 from which the paper sheet can be easily obtained. Thus, when a plurality of paper feed trays 15 are found out by the search, the paper sheet may be more easily obtained from the paper feed tray 15 which is displayed in a portion as upper as possible. This enables the user to more easily make a determination for selecting a suitable paper feed tray 15.

As shown in FIG. 8, the user selects a desired paper feed tray 15 in the search result display screen 22. When the column of a paper feed tray displayed on the screen is touched, the control section 17 determines that the paper feed tray 15 is selected. At this time, the control section 17 notifies the position of the paper feed tray 15.

A notifying section for indicating the position of the paper feed tray 15 is provided in the printing apparatus 1. The notifying section is configured by a notification lamp 50 for indicating the printing apparatus 1 and a display lamp 51, such as an LED, for indicating the paper feed tray 15. The display lamp 51 is provided for each of the paper feed trays 15.

The control section 17 transmits, to the other printing apparatus 1 having the selected paper feed tray 15, the selection information representing that the paper feed tray 15 is selected. In the other printing apparatus 1, upon receipt of the selection information, the control section 17 drives the notification lamp 50 and the display lamp 51 of the selected paper feed tray 15. The notification lamp 50 and the display lamp 51 are flickered. Thereby, the user is able to easily check the position of the printing apparatus 1 having the selected paper feed tray 15. Further, the user is also able to immediately find out the paper feed tray 15. Note that the notifying section is not limited to perform notification by light, but may perform sound notification by using a buzzer, and the like.

Figure 9:
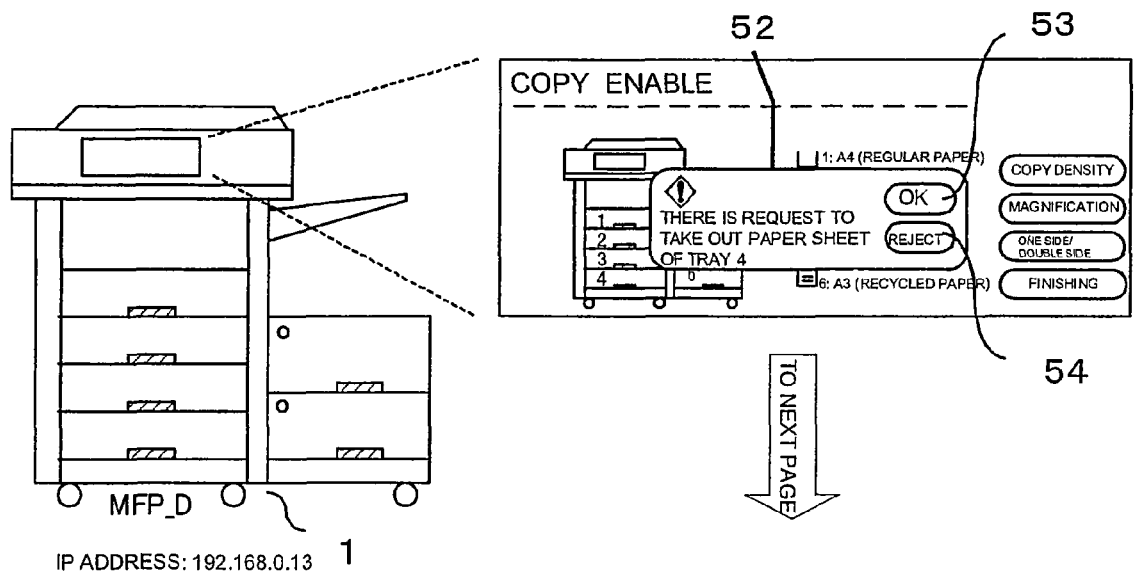
FIG. 9 is a figure showing a screen displayed at the time when a message is transmitted to the other printing apparatus.
Figure 10:
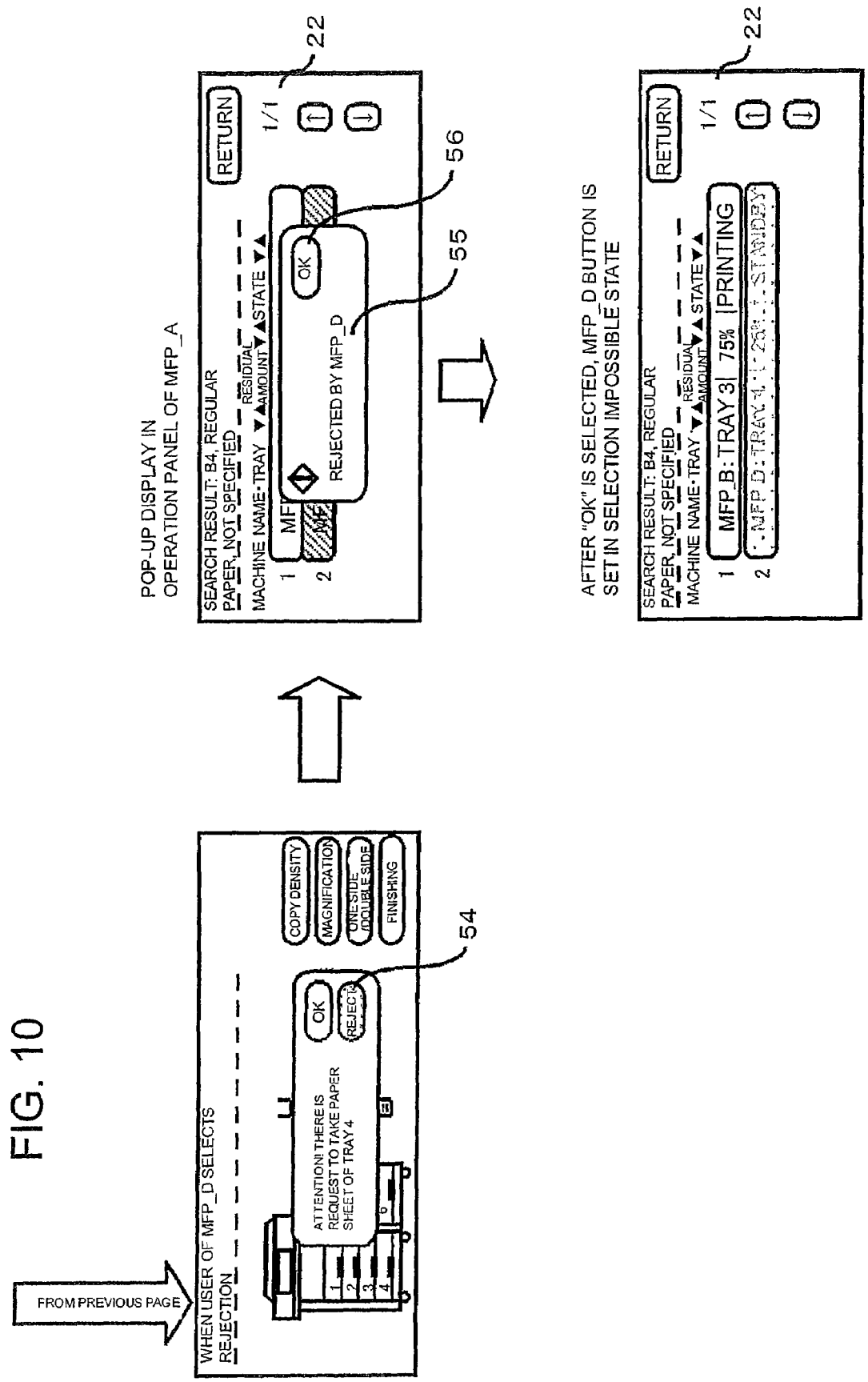
FIG. 10 is a figure showing a screen displayed at the time when a request for taking out the paper sheet is rejected.

Further, as the notification of the selected paper feed tray 15, the control section 17 performs the notification to the printing apparatus 1 having the paper feed tray 15. That is, as shown in FIG. 9 and FIG. 10, when the paper feed tray 15 is selected on the search result display screen 22, the control section 17 transmits a paper sheet request message to the other printing apparatus 1 having the paper feed tray 15.

In the other printing apparatus 1, upon receipt of the message, the control section 17 displays the message on the screen of the display panel. A request message screen 52 is displayed in a pop-up manner. Thereby, in the other printing apparatus 1, it is possible to check that the request for taking out the paper sheet is made.

When the printing apparatus 1 is in the standby state, there is no user using the printing apparatus 1 near the printing apparatus 1. The message is displayed as it is. When the printing apparatus 1 is in use, there is a user near the printing apparatus 1, and hence the user views the message. An acknowledge button 53 and a reject button 54 are displayed on the request message screen 52. The user is enabled to select whether to acknowledge or reject the request for taking out the paper sheet.

When the acknowledge button 53 is selected, the request message screen 52 disappears. At this time, the control section 17 transmits the message of acknowledgement to the printing apparatus 1 of the request source. The control section 17 of the printing apparatus 1 of the request source, upon receipt of the message, displays the message of acknowledgement on the screen. When viewing the message, the user goes to the specified printing apparatus 1, to take out the paper sheet. At this time, in the other printing apparatus, the print job under execution is temporarily interrupted.

When the reject button 54 is selected, the control section 17 transmits the message of rejection to the printing apparatus 1 of the request source. In the printing apparatus 1 of the request source, upon receipt of the message, the control section 17 displays a rejection message screen 55 on the search result display screen 22 in a pop-up manner. Then, when the user operates an acknowledge button 56 of the message screen 55, the control section 17 changes, in the search result display screen 22, the state of the selected paper feed tray 15 into the selection impossible state. The user becomes unable to select the paper feed tray 15, and newly selects the other paper feed tray 15.

Thereby, the paper sheet is taken out after obtaining the acknowledgement of the user using the other printing apparatus 1. The user using the other printing apparatus 1 is able to make the print job executed without interruption. Therefore, it is possible to prevent inconvenience from being given to the user using the other printing apparatus.

Note that the present invention is not limited to the above described embodiment, but numerous modifications and changes can be obviously made therein without departing from the spirit and scope of the present invention. By using the fact that the presence position of the required paper sheet can be recognized, the print job under execution may be transmitted to the printing apparatus corresponding to the presence position of the required paper sheet. When the paper feed tray is selected, the control section transmits the print job to the other printing apparatus having the paper feed tray. In the other printing apparatus, upon receipt of the print job, the control section executes the print job as instructed.

The control section provides the collected paper sheet information to the user by displaying the state of each of the paper feed trays on the display panel screen. The destination to which the collected paper sheet information is provided, is a portable communication terminal, such as a portable telephone and a PDA, which is owned by the user having requested the search. The control section transmits the search result information to the portable communication terminal. The portable communication terminal displays the search result on the screen, to notify the presence position of the required paper sheet to the user.

Further, when the paper sheet is exhausted during execution of the print job, the paper sheet exhaustion message is displayed. However, it may also be configured such that before the paper sheet is exhausted, a paper sheet exhaustion warning message is displayed at the time when the residual paper sheet amount becomes smaller than a specified amount. Thereby, the paper sheet can be replenished before the paper sheet is exhausted, so that the interruption period of the print job can be reduced.

When notifying the position of the selected paper feed tray, the control section displays, on the display panel screen, a map indicating the installation site of the printing apparatus. The user is able to easily recognize the position of the printing apparatus. When there are many printing apparatuses, the position of the printing apparatus is immediately known, and hence the user is able to more easily go to the printing apparatus to obtain the paper sheet.

What is claimed is:

1. A print system configured by communicably connecting a plurality of printing apparatuses having a paper feed tray to each other via a network,
    wherein the printing apparatus includes a monitoring section configured to monitor the state of the paper feed tray, and a control section configured to control a printing operation according to the state of the paper feed tray, and
    wherein when the monitoring section detects that paper sheets are required for the paper feed tray during execution of a printing operation, the control section interrupts the printing operation, and when the user operates to collect paper sheet information, the controls section collects paper sheet information on the state of the paper feed tray from the other printing apparatus, and
    searches, on the basis of the paper sheet information, a paper feed tray of the other printing apparatus, in which an available paper sheet is stored, and
    wherein when the paper feed tray is selected, the control section transmits a paper sheet request message to the other printing apparatus having the paper feed tray, and the other printing apparatus having received the paper sheet request message selects whether to acknowledge or reject the request, and when the request is acknowledged, the other printing apparatus interrupts the print job under execution, and when the request is rejected, the other printing apparatus transmits a rejection message, and the printing apparatus having transmitted the paper sheet request message changes a state of the corresponding paper feed tray into the selection impossible state.

2. The print system according to claim 1, wherein the control section searches the other printing apparatus according to a specific condition.

3. The print system according to claim 1, wherein the control section displays a list of searched paper feed trays.

4. The print system according to claim 3, wherein the control section switches the display order of paper feed trays according to the easiness in obtaining the paper sheet.

5. The print system according to claim 1, wherein the control section notifies the position of a paper feed tray selected from the searched paper feed trays.

6. The print system according to claim 5, wherein the printing apparatus includes a notifying section configured to indicate the position of the paper feed tray, and wherein when the paper feed tray is selected, the control section operates the notifying section to notify the position of the paper feed tray.

7. The print system according to claim 1, wherein the control section of the printing apparatus performing a printing operation requests paper sheet information from the other printing apparatus, and wherein the control section of the other printing apparatus acquires paper sheet information from the monitoring section and returns the acquired paper sheet information to the printing apparatus of the request source.

8. A printing apparatus configured by communicably connected to the other printing apparatus having a paper feed tray via a network, comprising:
   a monitoring section configured to monitor the state of the paper feed tray; and
   a control section configured to control a printing operation according to the state of the paper feed tray,
   wherein when the monitoring section detects that paper sheets are required for the paper feed tray during execution of a printing operation, the control section interrupts the printing operation, and when the user operates to collect paper sheet information, the control section collects paper sheet information on the state of the paper feed tray from the other printing apparatus and searches, on the basis of the paper sheet information, a paper feed tray of the other printing apparatus, in which an available paper sheet is stored, and
   wherein when the paper feed tray is selected, the control section transmits a paper sheet request message to the other printing apparatus having the paper feed tray, and the other printing apparatus having received the paper sheet request message selects whether to acknowledge or reject the request, and when the request is acknowledged, the other printing apparatus interrupts the print job under execution, and when the request is rejected, the other printing apparatus transmits a rejection message, and the printing apparatus having transmitted the paper sheet request message changes a state of the corresponding paper feed tray into the selection impossible state.

* * * * *